Feb. 14, 1928.
A. Y. DODGE
1,659,544
APPARATUS FOR AND METHOD OF TAKING UP SLACK
Filed May 24, 1924
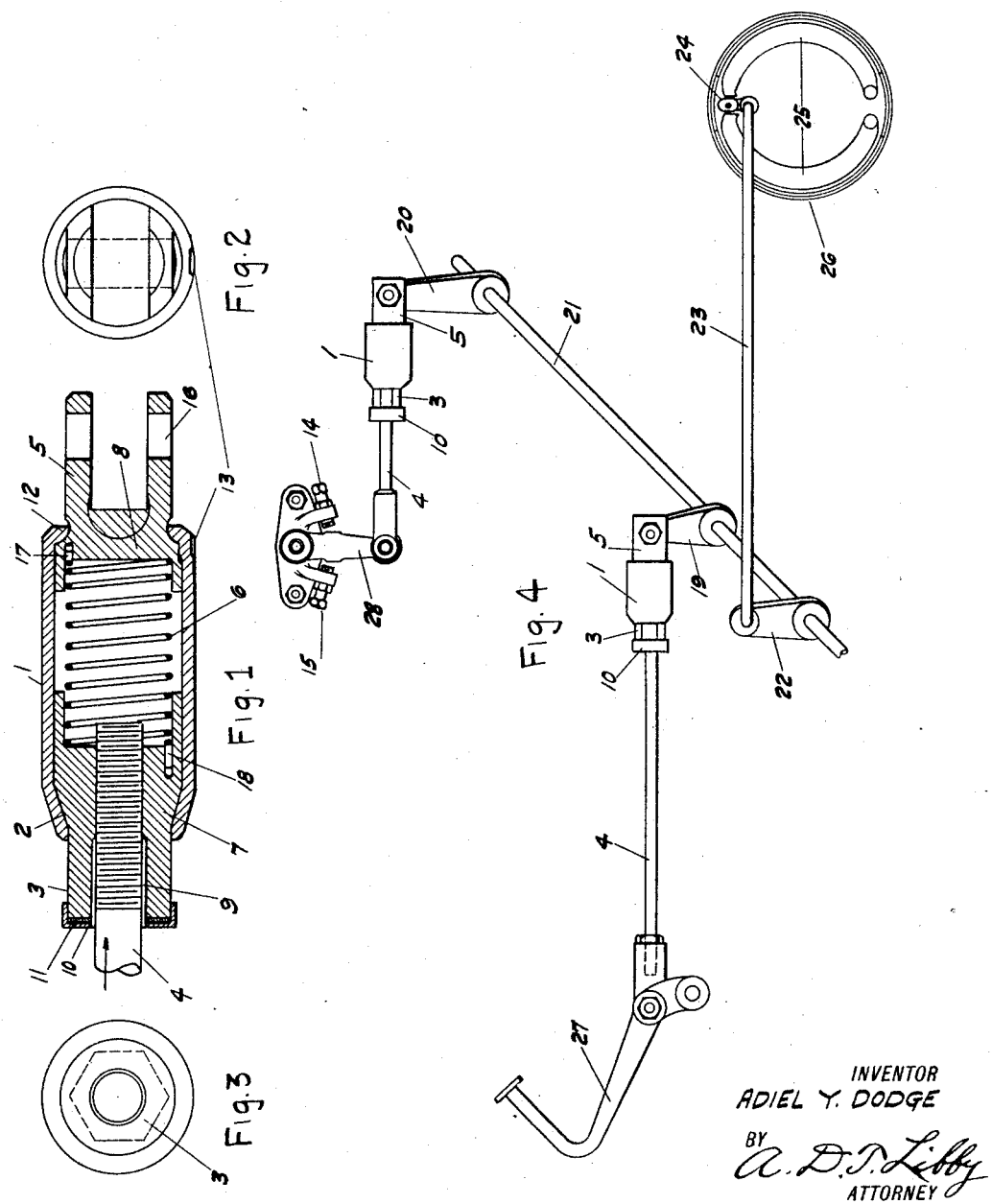
INVENTOR
ADIEL Y. DODGE
BY
A.D.T.Libby
ATTORNEY Patented Feb. 14, 1928.

1,659,544

UNITED STATES PATENT OFFICE.

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS.

APPARATUS FOR AND METHOD OF TAKING UP SLACK.

Application filed May 24, 1924. Serial No. 715,504.

This invention relates to apparatus for and method of automatically taking up the slack due to wear on the parts of the system in which the apparatus is used. In order to illustrate my invention I have shown the apparatus used for taking up slack in connection with the braking system of an automotive vehicle. On a vehicle of this kind the brakes wear more or less rapidly and require frequent adjustment to take up the wear.

It is, therefore, the principal object of my invention to provide a simple apparatus or device which will automatically take up the slack in the system due to the wear of the brakes or other mechanism in which the apparatus or device may be used.

Another object of my invention is to provide an apparatus or device which may not only be utilized in new systems or installations, requiring such a device, but may be readily applied to arrangements already in use.

My invention and its practical application will be best understood by reference to the drawings, wherein:

Figure 1 is a section through the apparatus or device, which in this specification as well as in the claims will be referred to as a self-tightening turnbuckle.

Figure 2 is a right hand and Figure 3 a left hand end view of Fig. 1.

Figure 4 shows the application of the self-tightening turnbuckle to a vehicle braking system, only one set of brake shoes being indicated.

Referring to the details wherein like numbers refer to corresponding parts in the various views, 1 is a tubular shell, preferably made of strong material, such as steel, which has one end 2 formed conically to provide an inner clutch surface for a corresponding conical surface on a nut 7 which extends from the shell 1 into the hex head 3. The nut 7 is threaded to receive a connecting rod 4. The extension 3 of the nut 7 is counterbored, leaving a space 9 around the threads of the rod 4. The space 9 is adapted to be packed with grease so as to cover the threads on the rod 4, keeping them from rusting and providing easy relative movement between the nut 7 and the rod 4. The extension 3 is provided with a press cap 10, inside of which is a packing member 11 to hold the grease within the space 9.

In the opposite end of the shell 1 is positioned a member 8 having forked members 5, through which a hole 16 is provided for making connection thereto. The end of the tube 1 is spun over at 12 into a recess of the member 8, thereby locking the member 8 within the tube 1. In order to prevent the attachment member 8 from turning, the metal of the tube is indented at 13 into a depression provided in the member 8. The attachment member 8 is provided with a counterbore within its end and likewise the nut 7 is provided with a counterbore, both of said counterbores providing a seat for a spring 6 which is anchored to the member 8 at 17 and to the nut 7 at 18.

When the complete turnbuckle is assembled, the spring 6 is put under compression and when it is assembled into a system in which it is to operate, the nut 7 is turned with a suitable wrench to set the spring under considerable torsion stress, so that any compression strain on the member 4, as in the direction of the arrow, Fig. 1, releases the clutch surfaces so that the spring 6 will automatically turn the nut 7 until the clutch surfaces engage sufficiently to prevent the turning thereof.

The action of the turnbuckle will best be understood by reference to Fig. 4, which shows two of the devices applied to a braking system in which the two attachment members 5 are connected through the levers 19 and 20 to an oscillatable shaft 21, which in turn through the medium of the lever 22 is connected to a work shaft or brake rod 23. The rod 23 is connected to a cam 24 that actuates brake shoes 25 to engage the brake drum 26. The rod 4 of one of the turnbuckles is connected in the usual manner to a brake pedal 27, while rod 4 of the other turnbuckle is connected to a pendulum lever 28, which is pivoted to act between adjustable stops 14 and 15. By adjusting the stops 14 and 15 the whole braking system is given a predetermined amount of movement or wear of parts before the devices begin to function. After this wear has increased beyond this predetermined amount, the lever 28 engages the stop 15. This produces a thrust or compression strain on the rod 4, causing the tapered clutch surfaces between the nut 7 and the part 2 of the shell 1 to declutch, and the spring 6 being under torsional stress will turn the nut on the rod 4 and take up the slack by bringing the lever 28 back to the stop 14. Since this turnbuckle connected with the lever 28 has changed its position in taking up the slack, when the brake lever 27 is released after an application of the brakes in which one of the turnbuckles just described has functioned, the pedal lever will not come back to its normal or initial position due to the fact that the distance between the levers 20 and 28 has been shortened and the lever 28 engages the stop 14. When the operator sees this, the foot pedal or lever 27 is pulled back by the foot of the operator, which produces a thrust on the rod 4 connected to the other turnbuckle, which then functions in the manner already described, taking up the slack at this point and restoring the system to its normal taut condition.

While it will be readily appreciated that the application of my new form of turnbuckle is highly advantageous to the braking system of a vehicle, it will be understood that it may be useful for other purposes. It is further to be understood that the self-tightening turnbuckle herein described is constructed in such a manner that the ordinary rattle and vibration of a vehicle does not affect its normal operation. It will also be understood that my invention is susceptible to certain modifications; for example, while I utilize one spring to perform two functions, it is not beyond the scope of my invention to utilize two springs, one to get the compression force required for the clutch surfaces herein described and another spring to give the torsional effort to the member 7. Consequently I do not wish to be limited to the exact details herein disclosed; for example, the extension 3 of nut 7 may be provided with other means than a hex shape shown in Fig. 3, it being understood that this extension is so formed that the nut 7 may be mechanically operated independently of the rod 4 to cause the turnbuckle to function.

Having thus described my invention, what I claim is:

1. In an apparatus of the class described, a tubular shell having an internal clutch surface at one end, a member having a part within said shell and provided with a clutching surface in engagement with the clutch surface on the shell, means for making attachment to the opposite end of the shell, and resilient means within the shell to produce clutching effort between said clutch surfaces and to cause rotation of said clutch member with respect to the shell when an extraneous force on said member overcomes the normal clutching effort of said resilient means.

2. In an apparatus of the class described, a tubular shell having an internal clutch surface at one end, a member having a part within said shell and provided with a clutching surface in engagement with the clutch surface on the shell, an attachment member having a part fastened to and within the opposite end of the shell, a compression spring within the shell and having one end anchored to said attachment member and the other end to said clutching member, means for placing said spring under a torsion stress, whereby when clutching engagement between said clutch surfaces is reduced a certain amount, by some extraneous force, said spring will turn said clutching member as and for the purpose described.

3. In an apparatus of the class described, a tubular shell having an internal clutch surface at one end, a member having a part within said shell and provided with a clutching surface in engagement with the clutch surface on the shell, an attachment member having a part fastened to and within the opposite end of the shell, said clutching member having its inner end counterbored and its outer end projecting beyond the shell and also counterbored for the purpose described, said member further being provided with a threaded hole extending between said counterbores to receive a threaded rod, a compression spring within the shell having one end anchored to said attachment member and the other end positioned in the inner counterbored hole of the clutching member and anchored thereto, and means on the external part of the clutching member to apply a torsion stress to said spring, whereby when a certain amount of compression is applied to said clutching member by its engaging rod, said member will be caused to turn for the purpose described.

4. In an apparatus of the class described, a tubular shell having an internal clutch surface at one end, a member having a part within said shell and provided with a clutching surface in engagement with the clutch surface on the shell, an attachment member having a part fastened to and within the opposite end of the shell, said clutching member having a part extending beyond the shell, said extended part being counterbored for the purpose described and also having a threaded hole of smaller diameter than the counterbore leading toward the interior of the shell, a threaded rod to fit said threaded hole, a cap fitting around said rod and over the extended end of the clutch member and a spring within the shell under compression to hold the clutch surfaces normally together, said spring also being under torsion stress to rotate said clutch member when said rod is subjected to a certain compression force as and for the purpose described.

5. An apparatus of the class described, comprising a self-tightening turnbuckle consisting of a shell having an inner conical clutch surface at one end, an internally threaded nut adapted to receive an operating rod and having an outer conical surface to engage said conical surface on the shell, an attachment member positioned in and fastened to the other end of the shell, a spring within the shell anchored at one end to said attachment member and at the other end to said nut, said spring being normally under compression to hold said two conical surfaces together in clutch relationship, said spring also being normally under torsion stress to rotate said nut when the nut is acted on through the rod by an exterior compression force opposite to and not less than that of the spring.

6. An apparatus of the class described, comprising a self-tightening turnbuckle consisting of a shell having one end formed inwardly to provide a clutch surface, an internally threaded nut having an outer clutch surface to engage the clutch surface on the shell, an attachment member fastened to the other end of the shell, a compression and torsion spring anchored at one end to said attachment member and at the other end to the nut, an operating rod threaded into said nut, said nut having a space for lubricant around the threads of the rod not threaded into the nut and means associated with the nut for holding the lubricant in said space.

7. An apparatus of the class described, comprising a self-tightening turnbuckle consisting of a shell having one end formed inwardly to provide a clutch surface, a nut having an outer clutch surface to engage the clutch surface on the shell, an attachment member fastened to the other end of the shell, a compression and torsion spring having an anchorage at one end in said nut, and an operating member rotatably attached to said nut as and for the purpose described.

8. Means for taking up slack, which includes two self-tightening turnbuckles, each composed essentially of a shell having a clutch at one end, a nut having a clutching surface to co-operate with the shell clutch, an attachment member fastened to the other end of the shell and a compression and torsion spring anchored between the nut and said attachment member, said attachment member being secured to an oscillatable shaft, said shaft being connected to a work member, a pendulum lever connected to the nut of one turnbuckle, adjustable stops for said lever, and an operating device connected to the nut of the other turnbuckle as and for the purpose described.

9. Means for taking up slack which includes two self-tightening turnbuckles, each composed essentially of a shell having a clutch at one end, a nut having a clutching surface to cooperate with the shell clutch, an attachment member fastened to the other end of the shell and a compression and torsion spring anchored between the nut and said attachment member, said attachment member being secured to an oscillatable shaft, said shaft being connected to a work member, means for applying a compression force to the nut of one of said turnbuckles to cause said turnbuckle to change the relative position of an operating device connected to the nut of the other turnbuckle, whereby said operating device may be moved to apply a compression force to the nut of said second turnbuckle to actuate the nut therein and restore the system to normal.

10. The method of taking up slack in a translating system, in vehicle brakes, which consists in providing two self-adjusting turnbuckles with two of their corresponding parts connected to a work member, and two other corresponding parts of the turnbuckle, one connected to a pendulum lever acting between adjustable stops and the other connected to an operating device then actuating said operating device until said pendulum lever engages one of said stops, thereby causing the turnbuckle connected to said lever to change the relative position of said operating device, then moving said operating device to cause the second turnbuckle to move to restore the system to normal.

11. An apparatus of the class described, comprising a self-tightening turnbuckle consisting of a shell having one end formed inwardly to provide a clutch surface, a nut having an outer clutch surface to engage the clutch surface on the shell, an attachment member fastened to the other end of the shell, a compression and torsion spring having an anchorage at one end in said nut, an operating member rotatably attached to said nut, said nut having an extension which may be engaged independently of said operating member to actuate the turnbuckle.

12. Brake-operating mechanism comprising, in combination, a brake-operating shaft, an operating lever, an auxiliary lever having a predetermined throw, a device connecting the shaft and auxiliary lever and operated to shorten itself automatically when the brake-applying movement of the shaft attempts to move the auxiliary lever beyond said predetermined throw, and a device connecting the shaft and operating lever and operated to shorten itself automatically on brake-releasing movement of the shaft after shortening of the first device.

In testimony whereof, I affix my signature.

ADIEL Y. DODGE.